Jan. 23, 1934.  R. W. TODD  1,944,585
AUTOMATIC CHANGE SPEED MECHANISM
Original Filed June 15, 1929  12 Sheets-Sheet 1
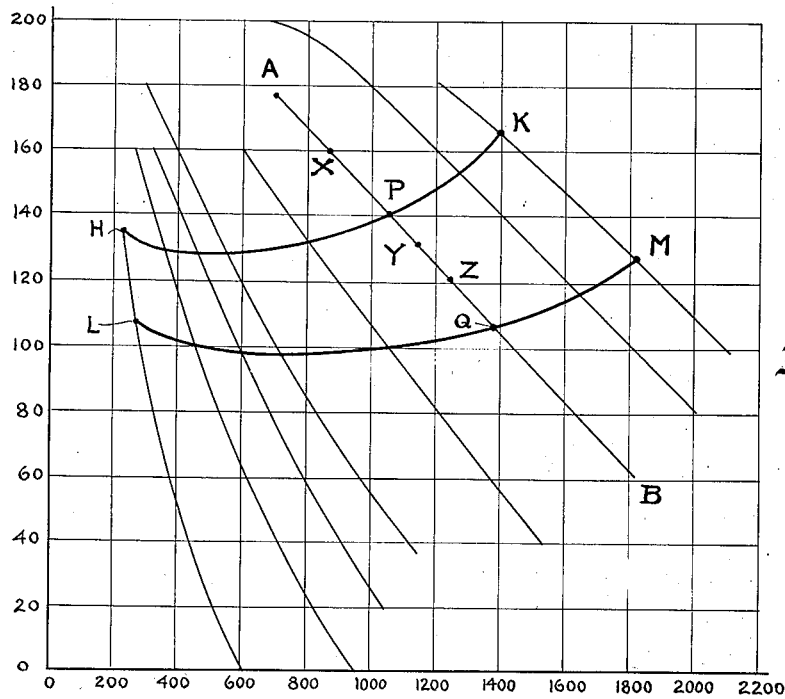
Fig. 1,
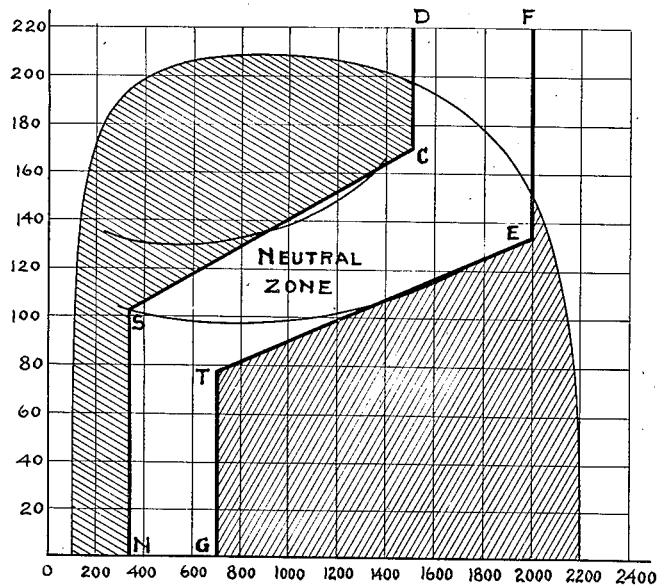
Fig. 2,
INVENTOR.
Russell W. Todd
BY Jeffery Kimball & Eggleston
ATTORNEY.

Jan. 23, 1934.     R. W. TODD     1,944,585
AUTOMATIC CHANGE SPEED MECHANISM
Original Filed June 15, 1929    12 Sheets-Sheet 2
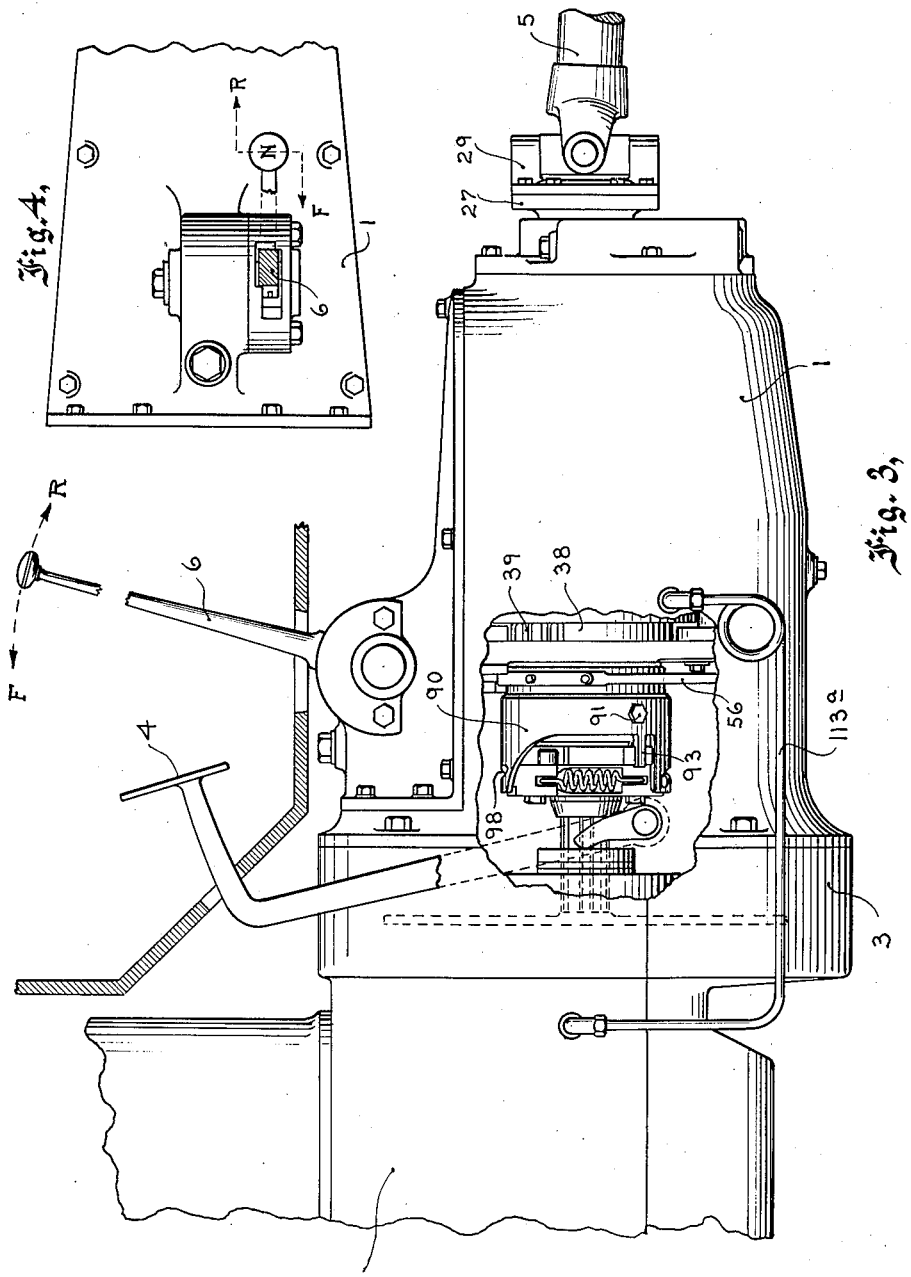

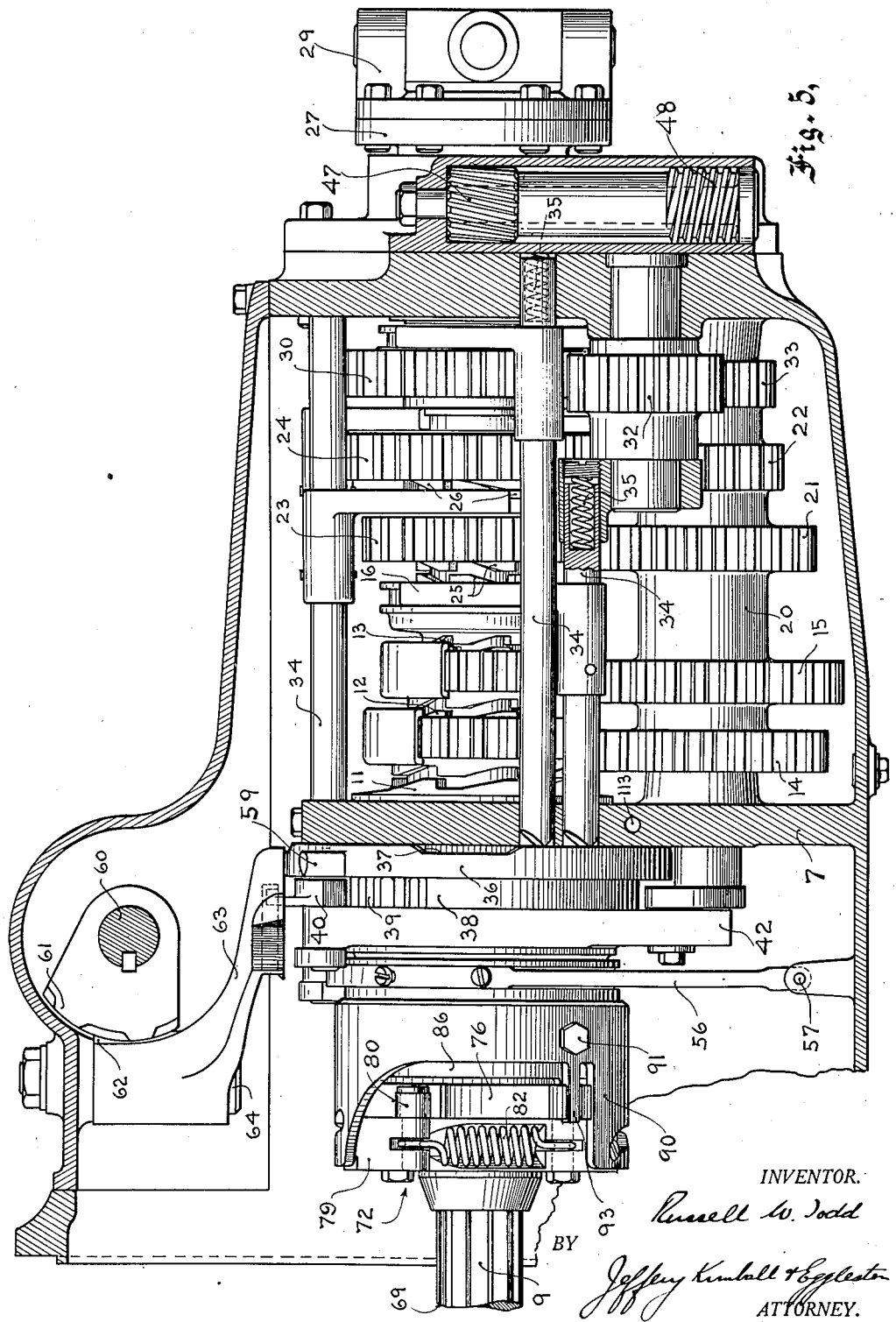

Jan. 23, 1934.　　　　R. W. TODD　　　　1,944,585
AUTOMATIC CHANGE SPEED MECHANISM
Original Filed June 15, 1929　　12 Sheets-Sheet 4

INVENTOR.
Russell W. Todd
BY
Jeffery Kimball & Eggleston
ATTORNEY.

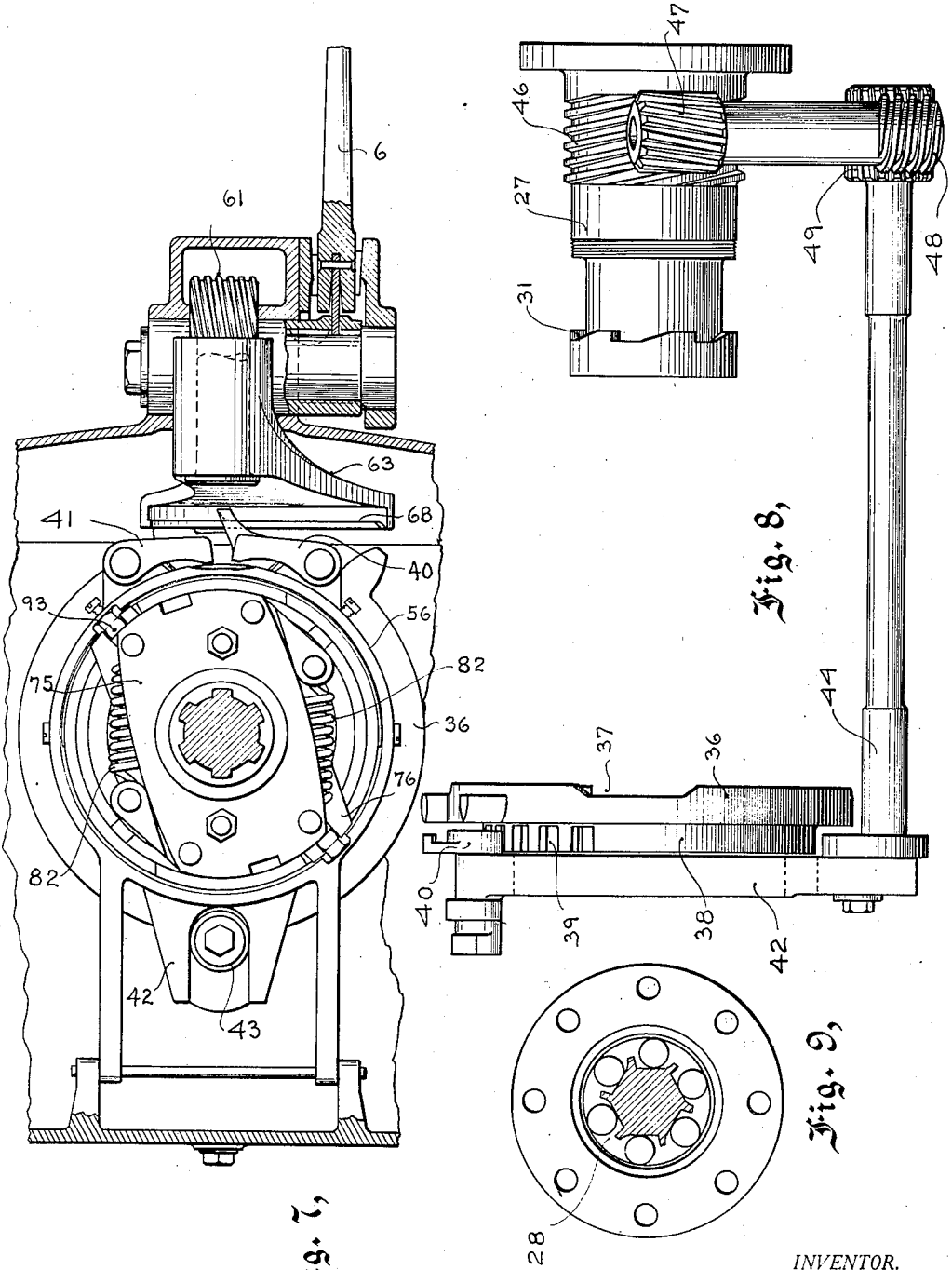

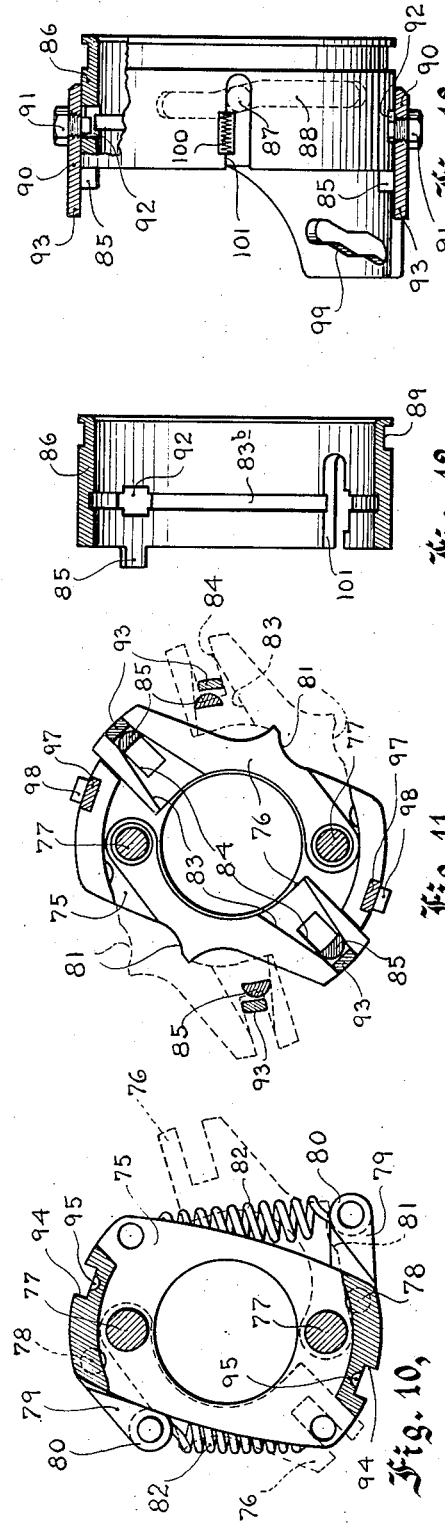

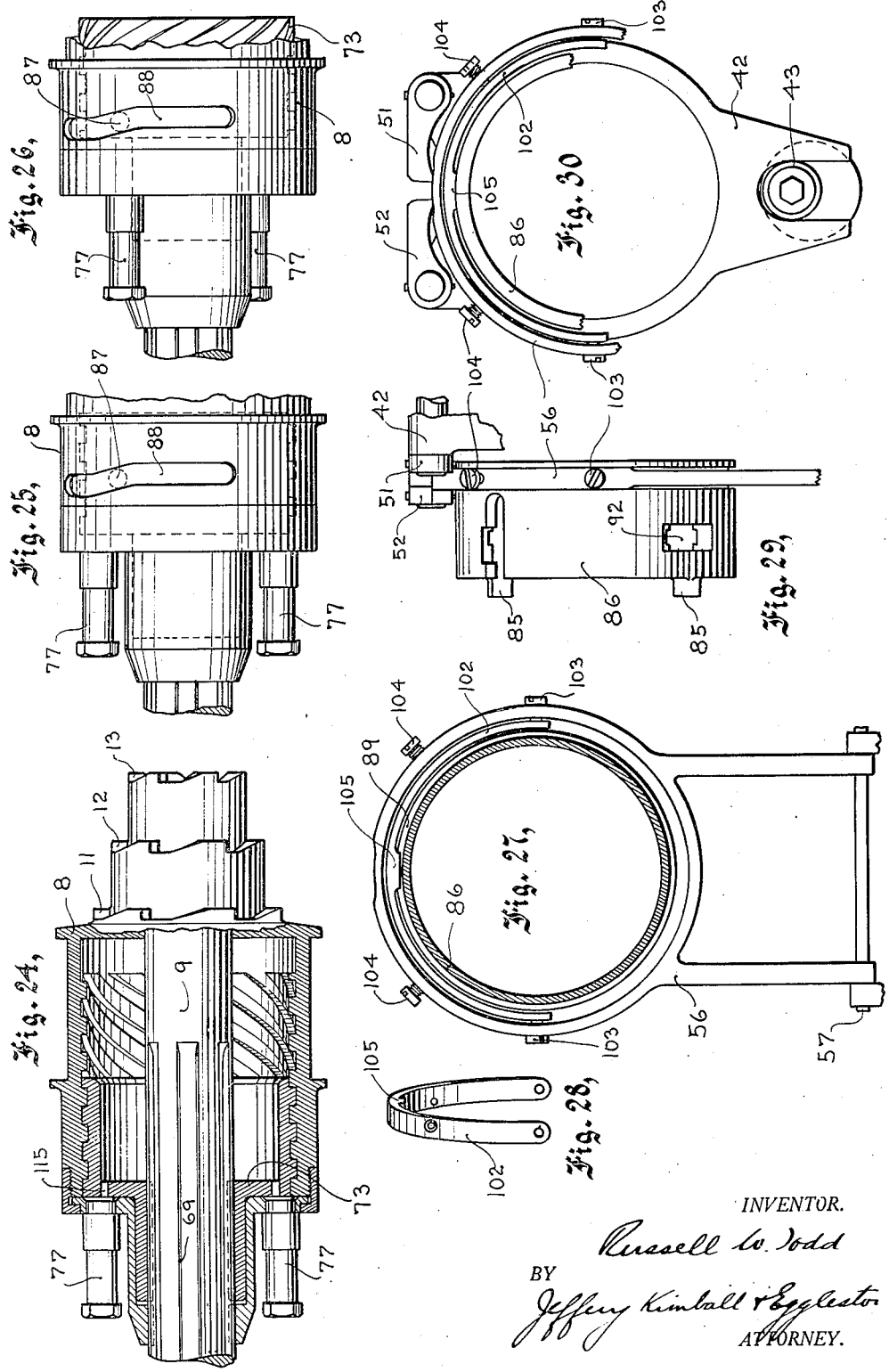

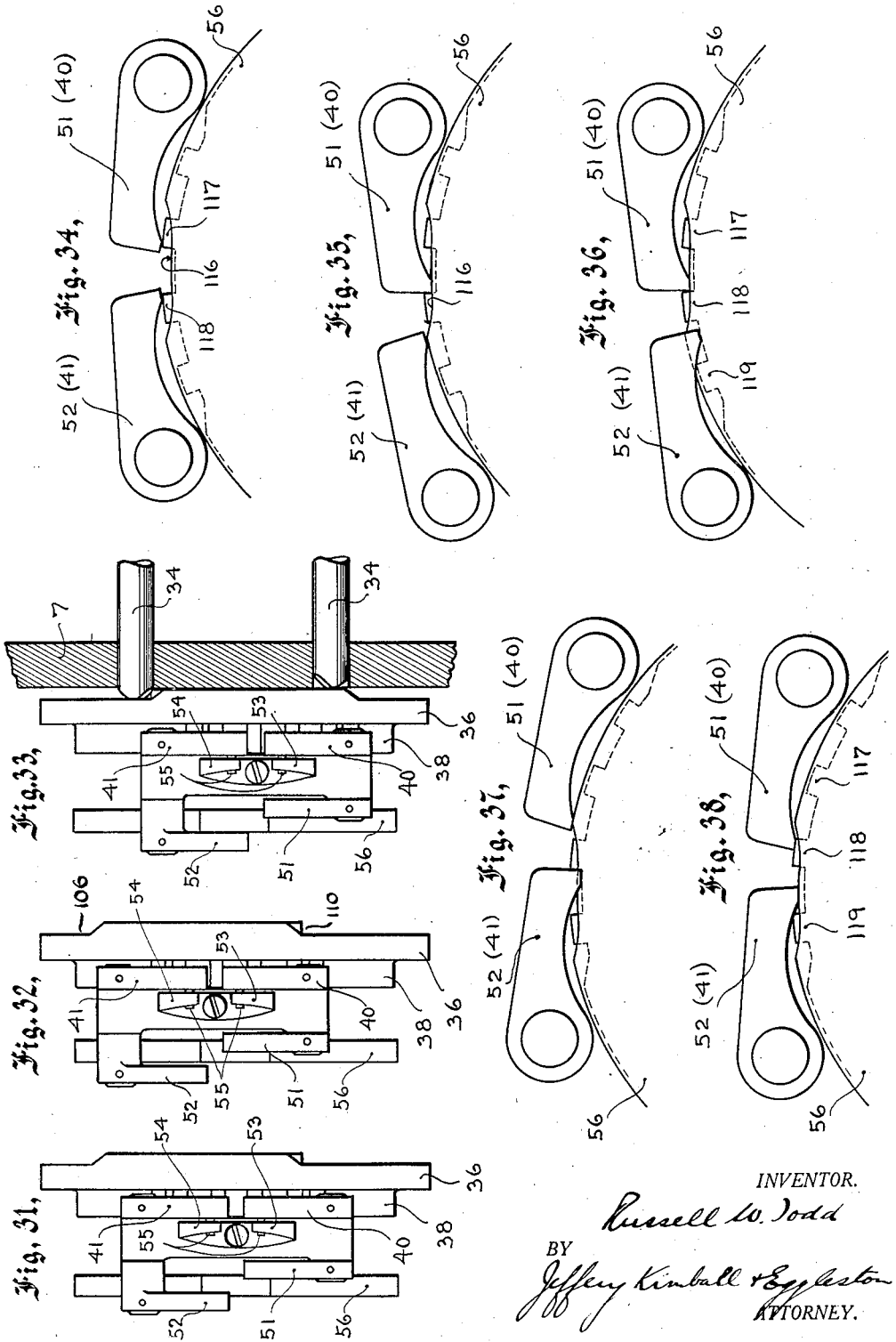

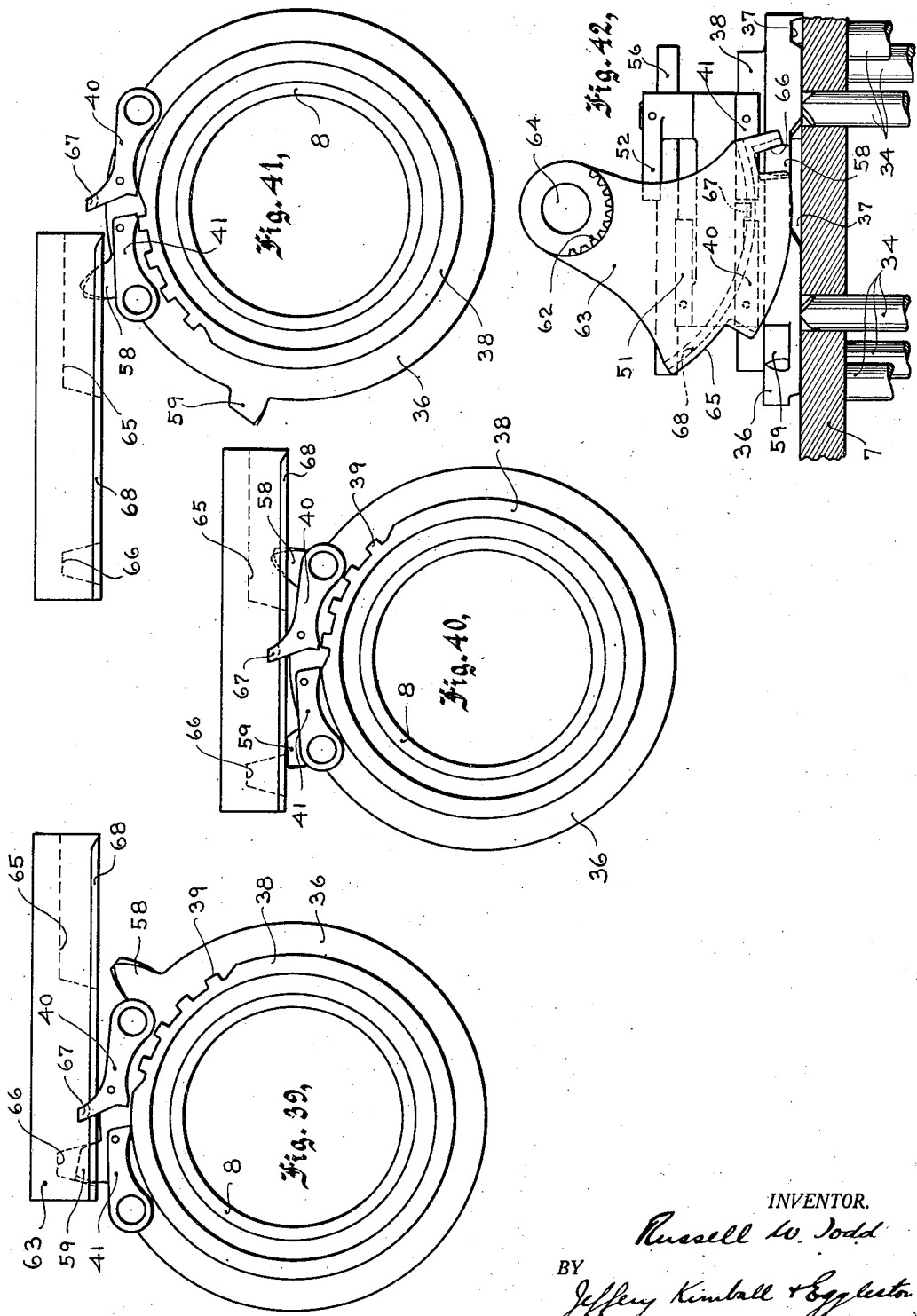

Jan. 23, 1934.   R. W. TODD   1,944,585
AUTOMATIC CHANGE SPEED MECHANISM
Original Filed June 15, 1929   12 Sheets-Sheet 10
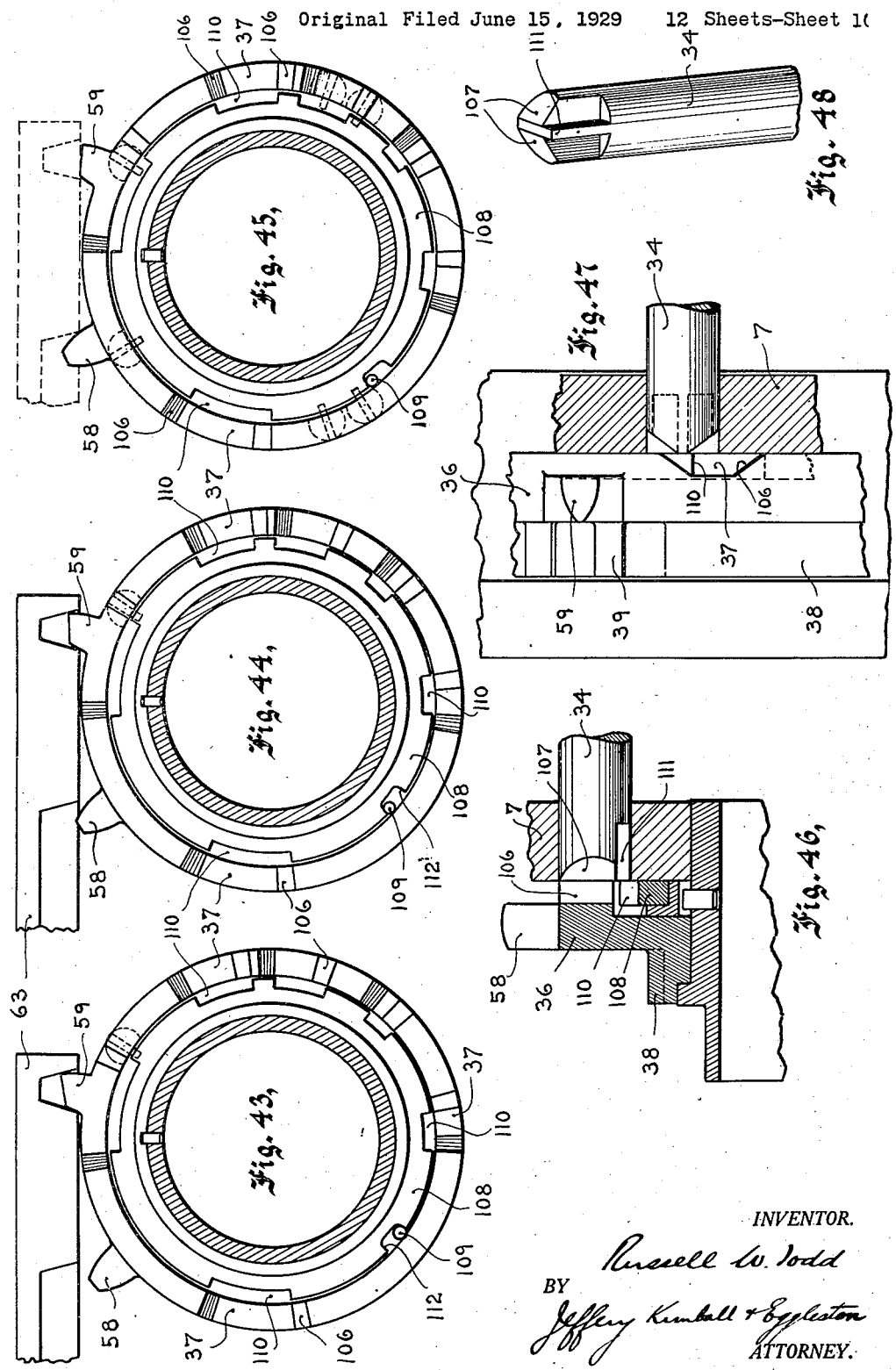
INVENTOR.
Russell W. Todd
BY
Jeffery Kimball + Eggleston
ATTORNEY.

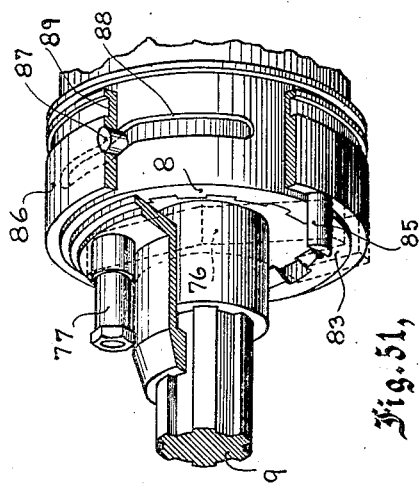
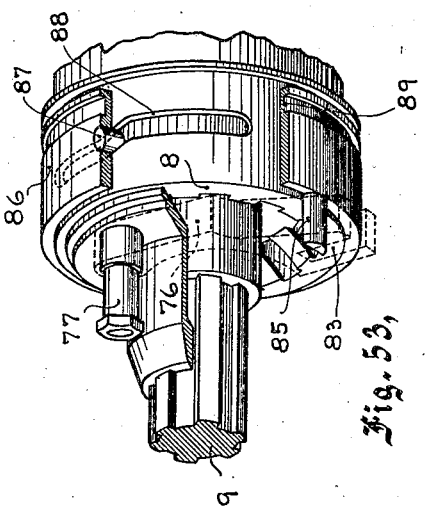
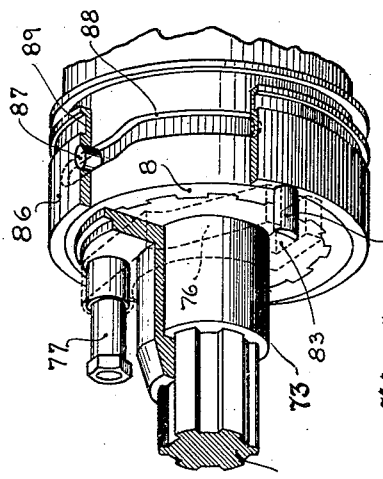
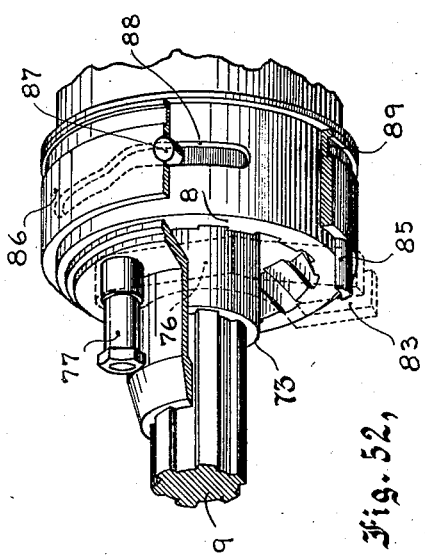
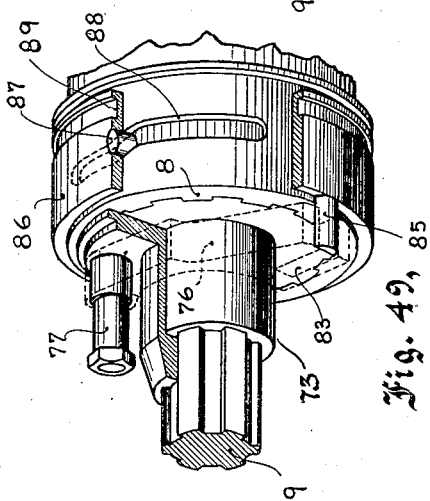

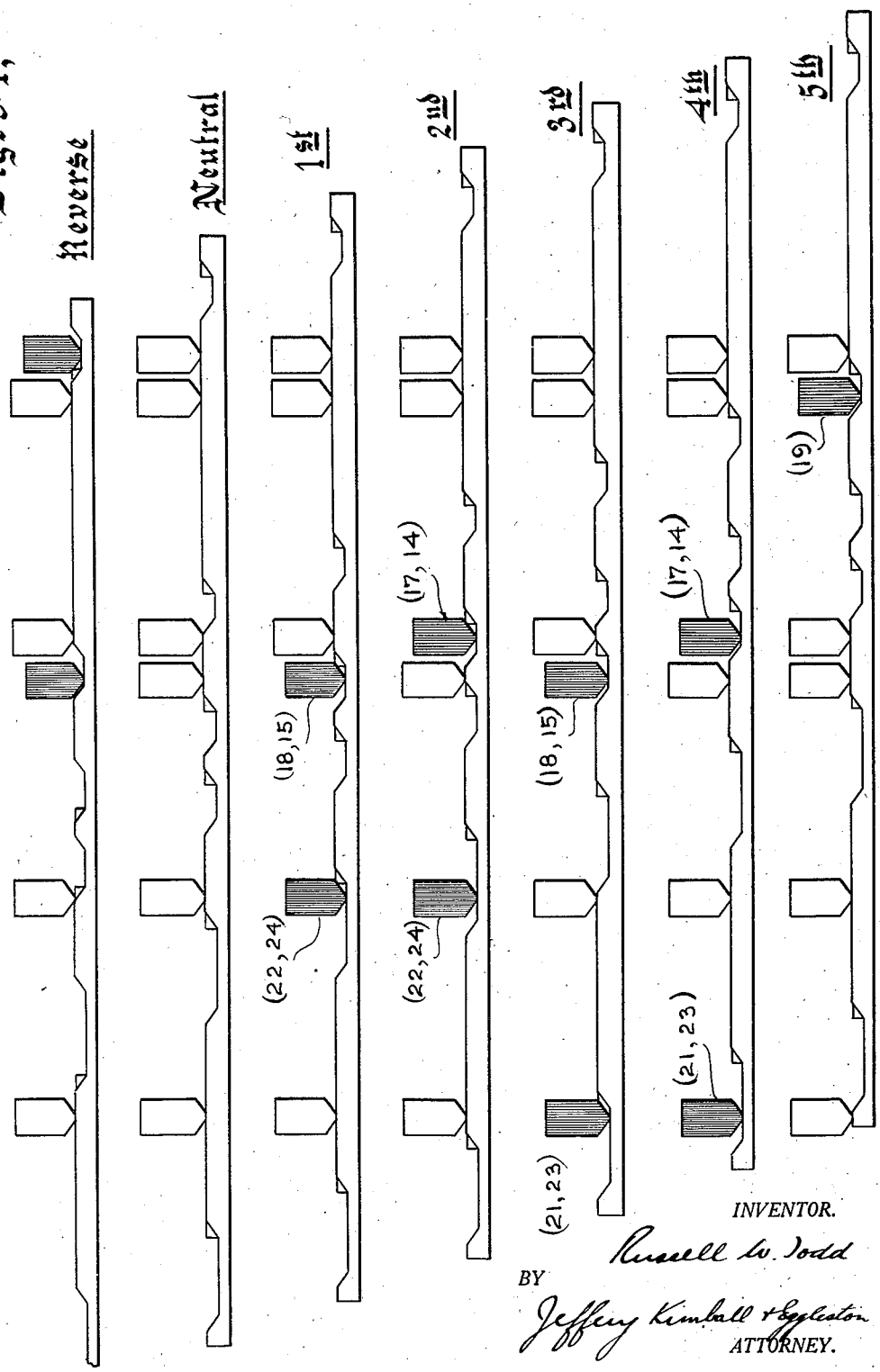

Patented Jan. 23, 1934

1,944,585

UNITED STATES PATENT OFFICE 1,944,585

AUTOMATIC CHANGE SPEED MECHANISM

Russell W. Todd, Bronxville, N. Y.

Application June 15, 1929, Serial No. 371,184
Renewed June 13, 1933

40 Claims.  (Cl. 74—59)

The invention relates to multiple-speed transmissions for automobiles or the like, in which the changing from one drive ratio to another is performed automatically and its object is to provide a mechanism of this type which is controlled by means sufficiently sensitive to the changing conditions under which the car is called upon to run, to provide such drive ratio as will enable the engine to function most efficiently at all times. In other words, the invention contemplates not only the elimination of manual shifting but also the provision of means for selecting, and for rendering effective, a drive ratio at all times appropriate to the running conditions.

The principles of the invention are applicable to any positive drive type of variable transmission and in general involve the organization of speed and torque-responsive means correlated to differentially control the transmission and arranged to effect an appropriate change of drive ratio whenever these factors register a departure from the desirable operating conditions for the particular engine. By "positive drive type" of transmission will be understood any variable or adjustable mechanism by which a true change of drive ratio or mechanical advantage may be effected, as distinguished from a variable drive of the slipping clutch type. In the accompanying description, which exemplifies such a transmission particularly suited to the requirements of an automobile propelled by an internal combustion engine, the several speeds or drive ratios are provided by various sets of gears.

In the accompanying drawings which illustrate a preferred embodiment of these principles:

Figs. 1 and 2 illustrate graphically the theoretical and actual operation of the controlling mechanism;

Figs. 3, 5 and 6 are views, in vertical section and in part broken out, showing a complete gear-type transmission mechanism in which the invention is incorporated;

Fig. 4 is a broken plan view of Fig. 3 showing the control gate;

Fig. 7 is an end view of the interior of the gear box taken from the left hand of Figs. 5 and 6;

Fig. 8 is a view of the elements constituting the power drive for the gear changing mechanism;

Fig. 9 is a cross-section of the over-running clutch;

Figure 6:
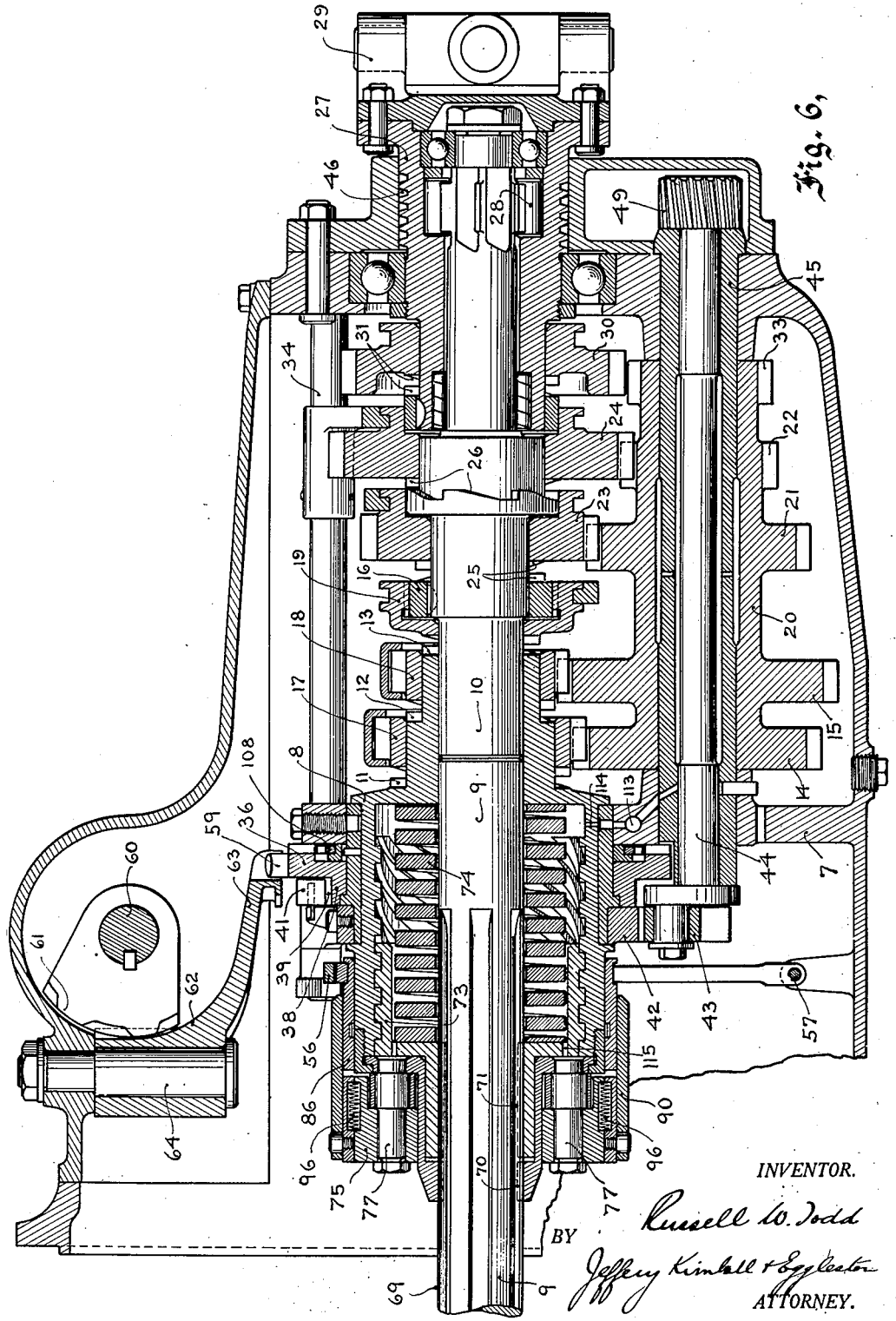

Figs. 10 to 21 inclusive are detail views of the governor and associated speed controlled mechanisms;

Figs. 22 and 23 are of constructional details;

Figs. 24 to 26 are views of certain of the elements of the load-responsive and associated mechanisms;

Figs. 27 to 33 inclusive show the control devices which finally direct the shifting mechanism;

Figs. 34 to 38 are larger scale views of the control devices of Figs. 27 to 33 and illustrate the same in the several positions they assume during operation;

Figs. 39 to 48 inclusive illustrate the interconnection of the manual control lever and the automatic mechanism of the box, together with details of the selector rods for the several gear settings;

Figs. 49 to 53 inclusive are broken out perspective views showing various positions of the mechanism corresponding to different load and speed conditions; and Fig. 54 shows a development of the control cam for each gear setting for which the box is equipped, and, cross-hatched, the selector rods which are operated at such times.

Since the invention involves the employment of inter-related speed and torque-responsive controls, as above stated, it is necessary to determine the general characteristics of the engine with which it is to be used so that the most desirable operating conditions may be maintained in accordance with the output of which the engine is capable without overloading. In Fig. 1 the series of more or less parallel curves represents, by actual test, the output (speed-load) of the particular engine for which the mechanism below described was designed, each curve indicating a different throttle setting. The horizontal and vertical ordinates indicate respectively the speed, in revolutions per minute (0–2200) and the torque, in foot pounds (0–200), the engine being a rather large, slow speed, eight cylinder unit.

Regardless of the kind of transmission mechanism and the number of different speeds, it will be apparent that in changing from one drive ratio to another the gain or loss in mechanical advantage should be closely counterbalanced by the resulting loss or gain in engine torque, otherwise the operator will feel that the change has been made too soon, or too late, as the case may be. Furthermore, since at any throttle setting repeated up and down shifts must all produce the same relative change of ratio and engine torque, the changes should all involve the same variations in the drive ratio or, in other words, the different speeds (ratios) should be arranged in approximately geometric series. The multiplier for this series is determined, as will be understood, by the range of ratios to be covered and the number of ratios to be included within that range. In the present case five forward speeds are contemplated and the multiplier is approximately 1.32. With this figure fixed the correct points at which the drive ratio should be changed are readily ascertained, by trial, from the several speed and load curves.

For example, considering the curve A—B, (Fig. 1) and taking any point X therein; if this is a point at which a shift to a lower ratio should be made, then, if the resulting increase in mechanical advantage is to balance the resulting decrease in torque, the speed at this point multiplied by the factor 1.32 will denote a point on the curve which coincides with a point determined by dividing the factor 1.32 into the torque at the point X. The speed at X will be seen to be approximately 860 R. P. M. which figure multiplied by 1.32 equals 1135, which is the speed at point Y. The torque at point X will be seen to be 160 ft. lbs., which figure divided by the factor 1.32 equals 121, which is the torque at point Z. In other words, if the drive ratio is lowered (by the 1.32 factor) when the running conditions of the vehicle are represented by the characteristics of the point X, the speed of the engine will immediately increase to a point corresponding to Y and the torque will coincidently decrease to a point corresponding to Z. This condition, of unbalanced torque decrease and speed (mechanical advantage) increase, would cause an objectionable pull or "lurch", indicating that the change of ratio had been delayed too long. By thus testing a number of points those marked P and Q are determined at which the torque decrease and mechanical advantage increase exactly balance one another, indicating that if the drive ratio is lowered when the point P is reached the change will occur smoothly, without burdening the engine and without unduly increasing its speed. Similarly, of course, the point Q indicates the correct point at which the ratio should be increased, that is, for the throttle opening corresponding to the curve A—B. By plotting these points, such as P, Q, for each of the speed-load curves, the curves H—K, L—M are obtained. The space between these curves represents a neutral zone in which no shifting is called for; the upper curve (H—K) includes all the points at which the ratio should be decreased (down-shift points) and the lower curve (L—M) all the points at which the ratio should be increased (upshift points). On examining these curves it will be seen that the neutral zone increases in width as the speed increases, this being due to the fact that the higher the speed the less sensitive is the engine torque to speed changes. In other words, if the engine speed falls from 1600 R. P. M. to 1400 R. P. M., the torque increase is less than that which occurs when the speed falls say from 1000 R. P. M. to 800 R. P. M.

It is a fact that the speed and torque changes which require a change of ratio are identical with the speed and torque changes which result from such a change of ratio. That is to say, when the conditions represented by point Q change to those represented by point P, a change of ratio is effected (as hereinafter described) and thereupon the conditions change from those represented by point P to those represented by point Q. In practice therefore, I have found it necessary slightly to spread apart the shifting points to avoid hunting, as further explained below.

The mechanism now to be described is arranged to operate without attention from the driver, the speed and torque responsive devices being correlated so that whenever the point representing the speed-torque conditions, at any time, reaches a boundary or limit curve of the neutral zone a change of drive ratio occurs—up or down according as the conditions may require.

In the form of the invention herein illustrated a gear box 1 is conventionally mounted, as shown in Fig. 3, adjacent the engine 2, to which it is connected by a clutch mounted in the housing 3, the clutch having the usual pedal 4 convenient to the driver's station. The propeller shaft 5 transmits the drive to the rear axle.

The control of the transmission is manual in so far as concerns the initial forward or rearward movement of the car, that is to say, to engage the first or reverse speeds, and is accomplished by any suitable means convenient to the driver's station. Herein it comprises a control lever 6 mounted and arranged for operation just as is the customary shift lever except that the gate (Fig. 4) provides for only three major positions of adjustment of the control lever—neutral, first and reverse, as indicated, the higher speeds being engaged automatically. As below described however, the automatic mechanism by which this is accomplished is also released by the control lever, the latter being arranged to engage the lowest speed before the automatic mechanism is released, although if desired this function may be served by means other than the control lever.

As shown in Figs. 5 and 6, the partition 7 divides the box into two compartments, a forward control compartment and a rear transmission compartment, the partition also providing journal support through suitable bearings for several of the working parts and in particular for the cup member 8 (Fig. 6) which is the driving member for the mechanism contained in the transmission compartment. The cup 8 is freely mounted in part on the clutch shaft 9 and in part on the main shaft 10 and carries sets of clutch teeth 11, 12 and 13 from which the drive is transmitted either to the lay gears 14 or 15 respectively or (from the clutch teeth 13) to the direct drive member 16 which is secured to the main shaft, these several drives being rendered effective by the movement of the pinion clutch members 17, 18 and 19 which are permanently meshed with the lay gears 14 and 15 and the drive member 16, respectively.

The lay gears 14 and 15 are shown as an integral cluster, on a sleeve 20, with gears 21 and 22 which are constantly in mesh with pinions 23 and 24 slidably mounted on the main shaft for engagement therewith by means of the clutch teeth 25 and 26 respectively. The rear end of the main shaft drives a sleeve 27 through an over-running clutch 28, sleeve 27 in turn driving the coupling 29 which carries the propeller shaft.

Slidably mounted on the sleeve 27 is the reverse drive gear 30 movable into clutching engagement with the sleeve 27 through the teeth 31, the gear 30 being driven, through the reverse idler 32 (Fig. 5), from the gear 33 which is also a part of the lay gear set.

The transmission compartment therefore includes the movable gear coupling members 17, 18, 19, 23, 24 and, for the reverse drive 30, each of which is in driving engagement when moved forwardly of the box. The five forward speeds include, in effect, additional gear sets between the customary first and second, and between second and third, thus lessening the ratio changes an amount sufficient to ensure smooth operation without rendering the box cumbersome. The main clutch is, of course, not intended to be used when the changes are effected and since there should be no gaps between the drive in one gear and the drive in the next the incoming drive is engaged before the outgoing drive is disconnected, as below described, the pinion clutch members being of the over-running type to permit the lower (engaged) gears to over-run while the higher (engaged) gears transmit the drive.

To operate the several pinion clutch members, I have provided a plurality of selector rods 34 each forked to one of said members and tending to move the same forwardly (into engaging position) under the action of springs 35 (Fig. 5). The forward ends of rods 34 are slidable and guided in openings in the partition 7 but are controlled in their movements by an annular, rotatable member 36 which I term the master cam and which has three operating surfaces, namely, its rearward and forward sides and its periphery.

The rearward side of the master cam is provided with spaced indentations or face cam surfaces 37 into which certain of the rods 34 will be urged by their springs 35 in accordance with the gear to be engaged and the position of the master cam. This surface of the cam is shown developed in Fig. 54 and the rods which engage the depressions for the several gear sets are shown cross hatched, the various rods so shown providing the following combinations for the gears and clutch pinions above described:

First speed—18, 15, 22, 24; second speed—17, 14, 22, 24; third speed—18, 15, 21, 23; fourth speed—17, 14, 21, 23; fifth speed (direct)—13, 19; and reverse—18, 15, 33, idler 32, 30. Each of these settings couples the cup member 8 to the main shaft 10 and hence the propeller shaft 5—with the exception of the reverse drive which, on account of the over-running clutch, necessarily connects the cup member to the sleeve 27.

On the forward side of the master cam and on an annularly smaller portion 38 thereof I have provided a number of teeth 39 which are engaged, as hereinafter described, by one of two oppositely mounted pawls 40, 41 (Figs. 5, 6, 7 and 31 to 36) which I term respectively the upshift and downshift pawls since their function is to rotate the master cam, in one direction or the other, when permitted, to change the setting of the cam surfaces 37 with respect to the rods 34 and so change the gear set, up or down as the case may be. The pawls are pivoted to a frame member 42 which is oscillated by the engagement of its lower end (Figs. 5, 6, 7 and 8) with a roller carried eccentrically on the end of shaft 44 which rotates freely within sleeve 45 on which the lay gear cluster is journalled. As shown in Figs. 5, 6 and 8 the shaft 44 is power driven from the sleeve 27 by worm 46, worm wheel 47 and skew gears 48 and 49, gear 49 being secured to the end of shaft 44. By this means the frame member 42 which carries the pawls is oscillated slowly about the clutch shaft whenever the car is in motion.

As shown in Figs. 31, 32 and 33 however the pawls are mounted in pairs, the upshift and downshift pawls 40, 41 each having a control pawl (51 and 52 respectively) mounted for movement therewith, the pairs of pawls being urged downwardly by springs 53, 54 which engage the pins or projections 55 on the upshift and downshift pawls. Separate control pawls are provided only as a matter of convenience in relation to the operating mechanism and if preferred their function may be performed by appropriate extensions of the main pawls. The control pawls, and consequently the upshift and downshift pawls, are held in an elevated position (except during the change from one drive ratio, or gear setting, to another) by a control shoe 56 which is pivoted in the lower part of the box (as at 57) and on which the control pawls rest. The shoe is shown in plan in Figs. 31, 32 and 33 and in side and front elevation in Figs. 5 and 27 respectively, and, as will be seen from these figures, when the control shoe is rocked forwards, i. e. toward the front of the box, the control pawl 51 will be released and the upshift pawl 40 allowed to drop into engagement with the teeth 39 on the master cam and conversely when the control shoe is rocked in the other direction the control pawl 52 and downshift pawl 41 will be permitted to drop. This latter operation is illustrated in Figs. 31, 32 and 33.

The third operating surface of the master cam, viz. the periphery, is provided with a gear tooth 58 and a second and mutilated tooth 59 (Figs. 39–45 inclusive) these teeth providing an interlock between the operating mechanism as a whole and the control lever 6. Movement of lever 6 forward or backward rocks its pivot shaft 60 (Figs. 5 and 6) and this in turn through the gears 61, 62 rocks the horizontal sector 63 about its vertical axis 64. Reverting now to Figs. 39 to 42 it will be seen that the sector 63 is cut away as at 65 and 66 for overlapping engagement with the gear teeth 58 and 59 respectively, so that with these teeth in the positions shown in Fig. 39 (which is when the master cam is in its "neutral" position i. e. when none of the rods 34 occupies face cam depressions 37) movement of the control lever, say forwards, swings the sector 63 and so rotates the master cam to the position shown in Fig. 40 whereupon certain of the cam depressions 37 will be brought into registry with the rods 34 viz. those which control the first speed gear setting, these rods moving into the depressions to engage the first speed gear combination above set forth and illustrated in Fig. 54. It will be noted that this occurs when the sector 63 has moved but a short distance and at this time the upshift pawl 40 is held in an elevated position and off the teeth 39 by a lateral finger 67 on the pawl resting on a shelf 68 on the sector. By this means the automatic functioning of the gear box may be prevented and the car driven indefinitely in a certain transmission setting, herein the lowest or first speed, which is particularly desirable, when starting up on a slippery surface, for example. The locking arrangement is, of course, adaptable to satisfy requirements other than that suggested, as will be apparent. As the forward movement of the control lever 6 is completed and since the sector now moves over the top of the mutilated tooth, no further rotation of the master cam occurs but the shelf 68 pulls out from under the finger 67 and so unlocks the upshift pawl 40 (Fig. 41). This further movement permits the upshift pawl 40 to drop and so permits effective operation of the control shoe 56 above mentioned. It will be seen however that the initial movement of sector 63 rotates the master cam far enough to bring tooth 58 within the recess 65 and this relation obtains throughout the automatic movement of the master cam. The latter travels between the limits indicated in Fig. 38 (first speed) and Fig. 41 (fifth speed) so that at any time the control lever can be moved back to its neutral position and in this movement shelf 68 will again pick up pawl 40, the end wall of recess 65 will engage tooth 58 and the master cam will be returned to its "neutral" position—Fig. 39.

Rearward movement of the shift lever, and consequently reverse movement of the sector 63 rotates the master cam, by engagement with the mutilated tooth, to a position in which the reverse speed rods 34 are released.

It will thus be apparent that the initial operation of a car equipped with this invention is the same as in cars equipped with the usual manual shift, that is to say, the operator opens the clutch, moves the shift lever forwards, thereby engaging first speed and then closes the clutch. Thereafter however the several changes are effected by the movement of the master cam under the action of the main pawls (40 or 41) as they are operated by the rocking member 42, itself driven from the sleeve 27. The master cam teeth 39 are four in number, each tooth being engaged in turn by the upshift pawl to move the master cam to its second, third, fourth and fifth speed positions and by the downshift pawl to move the cam to its fourth, third, second and first speed positions, these being the limits of automatic operation.

The pawls depend for their operation on the movement of the control shoe 56, as above mentioned, and in accordance with the objects of the invention the action of the control shoe is rendered entirely automatic by the mechanism now to be described and which, as will be understood, lies at the lefthand end of the gear box as viewed in Figs. 5 and 6.

Secured to the clutch shaft 9 by the splines 69 and feathers 70, 71, are a governor 72 and a plunger 73 which constitute respectively a speed and torque control as will presently appear, the plunger having external threaded engagement with the interior of the cup member 8 and operating to drive the same under the control of the spring 74 which is located between the plunger and cup.

Referring now to Figs. 7, 10 and 11, it will be seen that the governor comprises a frame 75 carrying weights 76, which are pivoted on studs 77, one of the weights being shown in detail in Fig. 21. Also pivoted to the governor frame, at 78, are links 79, each carrying a roller 80 at its outer end, which roller is urged into contact with a cam surface 81 on the weights by springs 82. An individual link is shown in Fig. 19. This governor constitutes the speed sensitive element of the differential speed and load control heretofore referred to. The springs 82 work against the expansion of the weights, through roller 80 which engages cam surface 81, and as will be apparent the mechanical advantage of the spring and link combination increases as the weights move outwards. The details of construction are of course subject to variation, the essential feature of the governor being that it is sensitive to speed variations through a wide range—the normal range of operating speeds of the engine—so that its controlling effect is available and accurate at all times. The construction herein shown has been found particularly well suited to this purpose, the range of the governor being materially extended by the increasing action of the spring pressed rollers and its characteristic speed-expansion curve readily determined, as below described.

The ends of weights 76 are slotted as shown at 83, 84 in Figs. 11 and 21 and engaging in the diverging portion 83 of this slot is a finger 85 which projects from an annular member 86 which I term the control sleeve—shown in situ in Fig. 5 and as a separate element in Fig. 12. The control sleeve is journalled on the cup member 8 and is connected therewith by a pin 87 on the inner surface of the control sleeve entering into and engaging a cam slot 88 formed in the outer surface of the cup member, this pin and slot connection being illustrated in Figs. 13, 17, 25 and 26. By this means the expanding governor weights rotate the sleeve 86 (through the finger 85) relatively to the governor frame and, through the pin and slot connection 87, 88, the sleeve 86 is moved longitudinally. The sleeve 86 is provided with a recessed track 89 (Figs. 12 and 13) in which is seated the pivoted control shoe 56, the latter thereby responding to the forward and rearward movement of the sleeve and hence to the governor and the speed of the engine.

It will be understood, however, that the speed factor is not the only one which determines the longitudinal movement of the control sleeve (and hence the control of the shoe, pawls, master cam and consequent gear setting) since, although the sleeve 86 is operated by the governor weights, the slot 88 of the pin and slot connection which actually causes the longitudinal movement of the sleeve is formed, as described, in the cup member 8 which is itself capable of relative movement in relation to the governor by reason of its indirect connection with the plunger 73 and this latter relative movement is determined by the yielding of the spring 74, i. e. by the torque.

The sequence of functions will now be understood to be as follows:

Engine running, car at rest, the clutch is disengaged and the control lever 6 moved forward to engage the first speed gear combination and release the upshift pawl 40—all as above described. At this time, and until the clutch is engaged, the speed and load control mechanisms occupy the "neutral" or "no-speed no-load" position indicated in Fig. 49; the governor weights are collapsed, the torque spring expanded to the full limit permitted by the cup and plunger, as indicated by the fact that the end face of the plunger is flush with the end of the cup, and pin 87 occupies a central position in the cup slot 88.

As the clutch is engaged the speed and load mechanisms respond to the conditions which result from the application of power to the clutch shaft, such conditions depending in turn upon the manner in which the operator manipulates the clutch, whether gently, as intended, or otherwise. Assuming the former to be the case, no undue starting load is imposed upon the engine and, provided the acceleration of the car is not forced, i. e. by abruptly opening the throttle, a predominating speed condition soon occurs which causes the governor weights to expand and slot 83 to move finger 85 and the control sleeve in a counter-clockwise direction relatively to the cup member. This action moves pin 87 in its slot 88 to the position indicated in Fig. 50, which movement, due to the configuration of slot 88 causes the control sleeve to slide forwardly on the cup, thereby drawing forwards the control shoe and releasing the upshift pawl, with the resulting shift above explained.

Although, as suggested, the operation of the controls in starting is dependent upon the manipulation of the clutch and throttle, it is not to be understood that any particular manipulation is necessary to successful operation. On the contrary the controls automatically serve to protect the engine against misuse and to accommodate the drive ratio to such conditions as the operator may produce. For example, if the clutch be engaged abruptly and the acceleration forced, although the engine may respond to the extent of developing a speed equivalent to that contemplated in Fig. 50, at the same time there will be developed a load condition sufficient to compress the torque spring, screw the plunger into the cup and thereby effect a relative counter-clockwise movement of the cup member, which movement prevents the pin 87 from leaving the neutral or mid-way position in slot 88. Under such conditions, illustrated in Fig. 51, no longitudinal movement of the control sleeve occurs and consequently no change of drive ratio until a still further speed increase, or torque decrease, permits.

After the upshift has been accomplished, it will be apparent that the decreased engine speed and increased torque will return the respective controls to the initial (Fig. 51) position and that this condition will obtain until the speed and torque controls call for a further upshift. Each of such upshifts is determined and accomplished in exactly the same manner as that already described, except of course that the clutch is not involved and therefore the running conditions of the vehicle control.

Fig. 52 represents the relative position of the parts when the engine is operating at a moderate speed but is subject to a load greater than that desirable for the existing gear ratio (as when ascending an incline) whether it be the high or some intermediate gear setting. Due to the speed of the engine the governor weights are expanded, which condition tends to effect an upshift, but on account of the undue load (for the particular gear setting) the plunger is screwed into the cup far enough to effect a relative counter-clockwise movement of the cup member sufficient to bring pin 87 to the rearward part of slot 88 (as indicated) thereby drawing the control sleeve and shoe rearwardly of the box and releasing the downshift pawl.

Fig. 53 illustrates the position of the parts under the load condition of Fig. 52 but when the engine is operating at a higher speed. Although the torque is the same as in the previous case it is not disproportionate to the speed and the further expansion of the governor weights locates pin 87 in the neutral part of slot 88 and no shift is required.

Under all running conditions therefore the final control of the gear box and the determination of the gear setting follows from the resultant of the interacting speed and load factors, the neutral and shifting zones being determined from the characteristics of the engine with which the invention is to be used. As above described the neutral zone is bounded by two gradually diverging curves (Fig. 1) but I have found that by means of straight line approximations of these curves not only are satisfactory results obtained but a somewhat simpler construction is permissible. For example, the characteristic curve of the simple spring embodied in the torque responsive device is from the nature of the spring a straight line and is therefore directly applicable to the straight line approximation and only requires determination as to its strength. Similarly, the characteristic curve of the governor, although not inherently so, is readily converted to straight line form by appropriately proportioning the weights and the shape of the cam surfaces 81 against which rollers 80 bear. Such an approximation is illustrated in Fig. 2 in which the shaded areas represent the shifting zones throughout the normal operating range and the central path the neutral zone. As above explained, this zone increases in width as the engine speed increases and in the operation of the mechanism above described this same action is determined by the shape of the slots 83 in the governor weights. The walls of the slots diverge so that at higher speeds a certain lag is introduced in the action of the control sleeve; in other words, the divergence of the walls of the slots increases the speed-torque differential necessary to effect a shift. Under certain conditions this lag effect might be destroyed as a result of friction between the control sleeve and the control shoe, but to guard against this I have shown a spring 83$^a$ (Fig. 23) mounted in slot 83$^b$ (Fig. 12) and having upturned ears 83$^c$ entering and engaging the ends of an opening 92. This spring itself sets up sufficient friction to overcome the drag effect or friction between the control sleeve and the control shoe, so that the former is operated only by the governor weight, that is, through finger 85 engaging the slot in the weight, and as a result, at the higher speeds produces the required lag and divergence of the upshift and downshift curves SC and TE respectively, as shown in Fig. 2.

The zones SN, TG and DC, FE represent the extreme (low and high) speed conditions under which the engine is called upon to operate and during which a change of ratio, although possible, is not desirable. For example, when the car (and consequently the engine) are travelling at fairly high speed under light load and by some means the torque is increased—as by the operator suddenly feeding still more gas to the engine—spring 74 will absorb this torque increase but as a result of the screwing down of plunger 73 into the cup member a downshift of the gears may be called for, and this, with the engine already running at high speed, would be undesirable. Similarly if the car is travelling at low speed under very light load or if the torque is suddenly decreased, the expansion of the spring 74 may call too soon for an upshift of the gears i. e. at a time when the next higher gear setting would require that the engine speed be too greatly reduced.

To provide against these contingencies I employ a further control which I term a speed sleeve 90, shown in situ in Figs. 5 and 6 and in detail in Figs. 13 and 18.

This sleeve is mounted on the control sleeve 86 and interlocked therewith by screws 91 which project through the speed sleeve into the openings 92 in the control sleeve. Projecting forwardly of the speed sleeve and formed as a part of it are fingers 93 which project into the parallel slotted portions 84 of the governor weights just as the fingers 85 of the control sleeve project into the diverging slotted portions 83 of the weights. The outer surface of the governor frame 75 (Fig. 10) is longitudinally slotted as shown at 94, the slots having grooves 95 which position coil springs 96, as shown in Fig. 6. The slots 94 are adapted to contain each a sliding member 97 such as is shown in Fig. 20, the face of the members in contact with the bottoms of the slots 94 being grooved to contain the other half of springs 96 and the outer faces of the members 97 carrying pins 98 which engage the sides of cam slots 99 in the forward end of the speed sleeve.

As thus organized the speed sleeve functions only in accordance with the speed of the governor and in such manner that under the conditions above suggested the fact that the engine speed is either very high or very low will cause the speed sleeve to move either forwards or backwards, this in turn (through the screws 91) drawing the control sleeve in a similar direction to prevent a downshift or an upshift as the case may be. The movement of the control sleeve independently of the cup member 8 is rendered possible by reason of the fact that its pin 87 is connected with it not directly (as diagrammatically represented in Figs. 49 to 53) but by means of a second sliding member such as that which carries the speed sleeve pin 98, Fig. 13 showing the spring 100 for the control sleeve pin 87 and the slot 101 for the sliding member which carries this pin. This spring 100 is of course weaker than the spring 96 so that it (100) yields to the control of the latter (96).

Referring to Figs. 28 to 30 and a further constructional feature it will be seen that the control shoe 56 does not engage the track 89 in the control sleeve directly but through the intermediary of a yoke 102 which is pivoted to the shoe by the screws 103 the yoke thus being adjustable and capable of being locked in the required position of adjustment by screws 104. By this means the relative position of the shoe and control sleeve may be varied to change the timing of the control pawls.

It will also be noted that the yoke 102 engages the track 89 only by means of a projection 105 thereby considerably reducing the friction between the yoke and the control sleeve.

Referring now to Figs. 43 to 48 inclusive a further feature appears.

The end surfaces 106 of the cam depressions 37 in the rear face of the master cam serve two purposes; they function during a change of gears, both to force back the rods 34 of the gear then in mesh and also to release the rods 34 of the next gear. For the former function a camming action is necessary and consequently the surfaces 106 are suitably graded to coact with the tapered ends 107 of the rods, but for the latter function viz, that of releasing the rods of the next gear, a snap action is preferable since otherwise the drive might be taken up while the teeth are perhaps barely in mesh. To overcome this objection I have therefore provided a follower 108 which moves within the master cam and which is driven by it by the pin 109. The follower has a series of depressions 110 corresponding to the depressions 37 of the master cam but of rectangular form. Similarly the ends of the rods 34 are formed with a rectangular fin 111 which registers with the follower depressions 110 just as the tapered end portion 107 registers with the master cam depression 37. It will also be seen that the follower depressions are the length of a depression 37 less one of the graded surfaces 106, and that the slot 112 in which the driver pin 109 is located is of such a length as to reverse the position of the follower relative to the master cam at each reversal of rotation of the latter.

Fig. 43 illustrates this relative position when the master cam is, or has been, rotating in an anticlockwise direction and Figs. 44 and 45 the relative position when the cam is rotating in a clockwise direction, and from these figures it will be apparent that the leading operating face of the combined depressions 37 and 110, that is, the face which is to permit the release of the rods 34 for the incoming gear, will always be one of the rectangular faces of a depression 110 and so provide the desired snap action. Similarly, the following operating face, that is, the face which is to force back the rods 34 of the outgoing gear, will always be one of the grade faces 106 and so provide the necessary camming action. In Fig. 54 it will also be observed that during the change from first to second speed only one pair of gears is changed, that is to say for second speed gears 17 and 14 are substituted for 18 and 15 and moreover that the former are let in before the latter are moved out so that as above mentioned, there is no gap or interruption in the drive. During the change from second to third speed however a double shift is involved, gears 18, 15 and 21, 23 being substituted for 17, 14 and 22, 24 respectively. Accordingly the continuity of the drive is maintained by permitting a momentary reversion to the first speed setting and then back to third speed by the single substitution of gears 21, 23 for gears 22, 24. If preferred the change may be to fourth speed momentarily and then back to third but the lower speed is more desirable. The change from third to fourth is made by a single substitution, just as in the change from first to second, and there is no necessity for any double shift.

Provision has been made for forced feed lubrication, as will be apparent from Figs. 3 and 6 and in this connection it will be seen that the interior of the cup member 8 is connected with the oil duct 113 through the hole 114, oil being supplied to duct 113 by way of line 113ª (Fig. 3). The head of the plunger 73 is also drilled at 115 to permit the oil to flow from one side of the plunger to the other as the plunger moves into and out of the cup member, this flow being sufficiently restricted however to give a cushioning effect to the oscillation of the plunger which necessarily occurs, to a certain extent, as the spring 74 expands or contracts—particularly under sudden torque changes, although, as will be understood, the torque spring itself acts as a cushion and, at least in part, absorbs the shock incident to sudden movement of the plunger. At such times, it will be appreciated that the first movement of the plunger (and the consequent relative movement of the cup member) will indicate accurately whether the required shift is to be up or down but that if the plunger oscillates to an appreciable extent the call for a particular shift may be almost immediately reversed and a certain "hunting" result until the oscillations cease. The oil cushion between the plunger and cup lessens the possibility of any such occurrence and the restricted orifice 115 prevents sudden recoil of the spring and plunger but it may also be positively prevented, over a certain range, by a construction such as illustrated in Figs. 34 to 38 inclusive, which show the control pawls 51, 52 and—since the profiles of these pawls are identical with those of the main pawls 40, 41—the positions of the main pawls, in relation to the teeth 39 on the master cam.

The control shoe is cut away as at 116 so that in the central portion of their throw and when the shoe is in its intermediate position, both the upshift pawl 40 and the downshift pawl 41 ride over the tops of the teeth 117, 118. At the ends of their throw (retracted) and when the shoe is in this same intermediate position the pawls 40, 41 are lifted off the teeth by their control pawls riding out of the cut 116 as shown in Fig. 35. In this figure the rocking member 42 which moves the pawls has just completed the counter-clockwise pawl movement, the earlier stage of this movement being shown in Fig. 34. When now the control shoe is moved, for example, rearwardly, that is, to effect a downshift, the pawls assume the position shown in Fig. 36, the position of the pawls 51, 40 not changing but the control pawl 52 dropping in front of the control shoe and the main (downshift) pawl 41 dropping between the teeth 118, 119 of the master cam. The return (clockwise) movement of the rocking frame 42 then shifts the pawls and master cam to the position shown in Fig. 37 throughout which movement the shoe 56 is positively locked by the control pawl 52 so that any oscillation between the plunger and cup member cannot reverse the gear shift call when once it has been made. In fact the shoe remains locked until the next return (counter-clockwise) movement of the pawls brings them to the position shown in Fig. 38 at which time the pawl 40 is already resting on the tooth 118 and so cannot return the master cam to the position it has just left; at this time also the lower side of the pawl 41 engages the edge of tooth 119, which raises the pawl and then only, permits the shoe to return to its intermediate position. This arrangement provides ample delay, under normal conditions, for the damping down of the oscillation of the plunger and cup member, but in addition I have found it desirable to include cushioning means, as for example, the oil-filled cup and the restricted plunger orifice.

Having now described my invention, I claim:

1. An automatic change-speed mechanism for automobiles, comprising means movable to successively connect a plurality of drives of different ratio between the engine and the vehicle wheels, a speed responsive device, a torque responsive device, and a common control means differentially operated by both of said devices and associated with said movable means whereby the latter is operated to vary the transmission ratio in accordance with both speed and torque.

2. An automatic change-speed mechanism for automobiles, comprising means for varying the drive ratio between the engine and the vehicle wheels, a member operative to cause actuation of said means, two elements differentially controlling said member, an engine-driven speed responsive device associated with and determining the action of one of said elements and a torque responsive device associated with and determining the action of the other of said elements.

3. An automatic change-speed mechanism for automobiles, comprising in combination with transmission members adjustable to vary the drive ratio from engine to vehicle wheels, power means for effecting adjustment of said members, a control for said power means, operable to cause said means to increase or decrease the drive ratio, a device responsive to engine speed, and a torque responsive device, said devices being correlated to differentially determine the operation of said control.

4. An automatic change-speed mechanism for automobiles, comprising in combination with a shaft and means movable to vary the drive ratio from the engine, through said shaft, to the vehicle wheels, of a control member movable relatively to said shaft to effect the operation of said movable means, a speed responsive device mounted on the shaft and adapted to be driven thereby, a torque device responsive to the engine torque applied to said shaft and operating connections between said devices and the control member.

5. An automatic change-speed mechanism for automobiles, comprising in combination with the clutch shaft and means movable to vary the drive ratio from the engine, through said shaft, to the vehicle wheels, of a control member movable relatively to said shaft to effect the operation of said movable means, two elements adapted upon predetermined relative movement thereof to operate the control member, a torque responsive device connected to one of said elements, a flyweight governor connected to operate the other of said elements and adapted to respond to relatively low speed operation of the clutch shaft and means operative in response to the expansion of the governor weights to increase the sensitive range thereof, for the purpose described.

6. An automatic change-speed mechanism for automobiles, comprising in combination with the clutch shaft and means movable to vary the drive ratio from the engine, through said shaft, to the vehicle wheels, of a control member movable relatively to said shaft to effect the operation of said movable means, a device responsive to the speed of the clutch shaft, a device responsive to the engine torque and yielding connecting means between said devices and the control member.

7. In an automatic change-speed mechanism for automobiles, operating means therefor comprising in combination with an engine-driven shaft, a speed-responsive device driven thereby, an element connected with said device for movement thereby in accordance with the speed of the engine, a torque-responsive device operated from said shaft, an element connected with said last mentioned device for movement thereby in accordance with the torque developed by the engine, power operated means for changing the drive ratio between the engine and vehicle wheels including a device for rendering said means active, a member for controlling said device, connections between each of said elements and said member and yielding means permitting independent relative movement of said elements and said last-mentioned device.

8. An automatic change-speed mechanism for automobiles, comprising transmission mechanism including means movable to vary the drive ratio between the engine and the vehicle wheels, a speed responsive device adapted to be driven by the engine, a torque responsive device connected to the engine in advance of said transmission mechanism and a control for said movable means operatively associated with and differentially controlled by said devices.

9. An automatic change-speed mechanism for automobiles, comprising in combination with the clutch shaft and means movable to vary the drive ratio from the engine, through said shaft, to the vehicle wheels, of a control member movable relatively to said shaft to effect the operation of said movable means, means responsive to the speed and load conditions of the engine for differentially controlling said member, and means responsive to effective movement of said member to temporarily lock the same.

10. An automatic change-speed mechanism for automobiles, comprising means movable to successively connect a plurality of drives of different ratio between the engine and the vehicle wheels, a speed responsive device, a torque responsive device, a common control means operatively associated with both of said devices and with said movable means, said control means including a locking mechanism responsive to effective operation of said devices and arranged to temporarily prevent further operation of said movable means.

11. An automatic change-speed mechanism for automobiles, comprising in combination with the clutch shaft and means movable to vary the drive ratio from the engine, through said shaft, to the vehicle wheels, of a control member movable in one direction to effect the operation of said movable means to increase the drive ratio and in the reverse direction to effect the operation of said movable means to decrease the drive ratio, means responsive to the speed and load conditions of the engine for operating said member in each direction, and means for temporarily locking said member against an opposite movement subsequent to predetermined movement thereof.

12. In an automatic change-speed mechanism for automobiles, including means movable to vary the drive ratio between the engine and vehicle wheels and power operated mechanism adapted for operating said movable means, a control for said mechanism comprising a pair of pivoted elements mounted thereon and a member normally engaging both of said elements to hold the same in inoperative position and movable to permit either of said elements to move into operative position to connect said power operated mechanism and movable means.

13. Mechanism of the kind set forth in the preceding claim in which said elements are offset in relation to each other to permit them to move one on one side of said member and one on the other, substantially as described.

14. Mechanism of the kind set forth in claim 12 in which said means movable to vary the drive ratio includes a toothed member rotatable in one direction or another to effect an increase or decrease in the drive ratio, and including a pair of oppositely mounted pawls arranged to operate said toothed member, each of said pawls being controlled by one of said pivoted elements.

15. In an automatic change-speed mechanism for automobiles, the combination of a toothed operating member rotatable in one direction or another to effect an increase or decrease in drive ratio, a pair of oppositely mounted pawls movable one at a time into engagement with the teeth on said member, power means for operating said pawls to effect rotation of the toothed member and means normally positioned to hold both pawls out of engagement with the toothed member, including a locking device operating coincidently with the movement of either of the pawls into operative position, for the purpose described.

16. In an automatic change-speed mechanism for automobiles, the combination of a toothed operating member rotatable in one direction or another to effect an increase or decrease in drive ratio between the engine and vehicle wheels, a power driven rocking frame, a pair of oppositely mounted pawls carried by said frame and movable into engagement with the toothed member to rotate the same, means normally positioned to hold both pawls out of engagement with said member, a speed-responsive device associated with said means and tending to operate the same in one direction under increasing speed and a torque responsive device associated with said means and tending to move the same in the reverse direction under increasing torque.

17. In an automatic change-speed mechanism for automobiles, means movable to vary the transmission ratio between the engine and the vehicle wheels, an automatic device for controlling the same, locking means for preventing the operation of said automatic device and a single manual control having at least three positions of rest, in one of which it disconnects the engine from the vehicle wheels, in another of which it connects the engine to the vehicle wheels in a predetermined ratio and in a third of which positions it releases said locking means to permit operation of said automatic device.

18. An automatic change-speed mechanism for automobiles, comprising means movable to vary the drive ratio between the engine and vehicle wheels, including a single member movable in one direction or another to effect an increase or decrease in the drive ratio, power means for operating said member, controlling mechanism for said power means, a speed-responsive device and a torque responsive device both associated with and differentially controlling said mechanism, and a manually operated control movable without regard to the position of said single member to move the same to disconnect the engine and vehicle wheels.

19. An automatic change-speed mechanism for automobiles comprising in combination a plurality of permanently meshed gears arranged to provide drive ratios varying in substantially geometric series, a drive shaft and a driven shaft on which said gears are mounted, clutch mechanism for connecting said gears in driving relation with their shafts, a single control member operable to actuate all of said clutch mechanisms, power means associated with said control member to operate the same and combined speed and torque responsive control mechanism for said power means.

20. An automatic change-speed mechanism for automobiles comprising in combination a plurality of permanently meshed gears arranged to provide drive ratios varying in substantially geometric series, a drive shaft and a driven shaft on which said gears are mounted, clutch mechanisms for connecting said gears in driving relation with their shafts, a single control member operable to actuate all of said clutch mechanisms, power means associated with said control member to operate the same, an element movable to control said power means, a speed-responsive device, and a torque-responsive device, said devices correlated to differentially control said element.

21. An automatic change-speed mechanism for automobiles comprising in combination a plurality of permanently meshed gears arranged to provide drive ratios varying in substantially geometrical series, a drive shaft and a driven shaft on which said gears are mounted, overrunning clutch mechanisms for connecting said gears in driving relation from the drive shaft to the driven shaft, a single control member operable to actuate said clutch mechanisms, power means associated with said control member to operate the same, an element movable to control said power means, a speed-responsive device driven from the engine, a torque-responsive device interposed between the engine and said drive shaft, said devices correlated to differentially control said element and said control member operating to connect the incoming gear set prior to the withdrawal of the outgoing gear set.

22. An automatic change-speed mechanism for automobiles comprising in combination with a plurality of gears and power means for variously connecting the same in driving relation between the engine and vehicle wheels, control mechanism for said power means, a speed-responsive device, and a torque-responsive device, said devices correlated to differentially operate the control mechanism.

23. An automatic change-speed mechanism for automobiles comprising in combination with a drive shaft and a driven shaft, a plurality of gears loosely mounted on said shafts, the gears on one shaft being permanently geared with those on the other shaft, clutching mechanism for variously connecting said gears in driving relationship with their shafts, a power operated member for actuating said clutching mechanism, and a speed-responsive device and a torque-responsive device operatively associated with said member for controlling the same.

24. In an automatic change-speed mechanism for automobiles the combination with a plurality of gears arranged to provide a variety of drive ratios between the engine and vehicle wheels, of clutch mechanism for connecting said gears in driving relation including snap-action means for connecting the incoming gear set and cam means for disengaging the outgoing gear set.

25. In an automatic change-speed mechanism for automobiles, means movable to successively connect a plurality of drives of different ratio between the engine and the vehicle wheels, a speed responsive device and a torque responsive device correlated to differentially control said means, said torque responsive device comprising a spring adapted to yield under predetermined engine torque and cushioning means adapted to limit the tendency of the spring to oscillate as a result of sudden torque changes.

26. An automatic change-speed mechanism for automobiles comprising in combination with a plurality of gears and power means for variously connecting the same in driving relation between the engine and vehicle wheels, control mechanism for said power means, a speed-responsive device, a load responsive device including a torque spring, said devices correlated to differentially operate said control mechanism and means controlling the recoil of said spring.

27. In an automobile the combination with the engine, of a multiple ratio transmission, a member for effecting up and down shifts thereof, an engine speed responsive device, a torque responsive device, said devices being correlated to differentially control said member, including means for varying, as the speed, the speed-torque differential requisite to effect a shift.

28. In an automobile the combination with the engine, of a multiple ratio transmission, an engine speed responsive device, a torque responsive device, a transmission control mechanism differentially operated by said devices, said mechanism and devices being correlated to establish a neutral zone within which they are ineffective to produce a shift and including means for enlarging said zone as the engine speed increases.

29. In an automobile, the combination with the engine, of a multiple ratio gear set, means for variously coupling said gears in driving relation, mechanism for actuating said means including a snap-action device for coupling said gears and a cam for uncoupling the same, and engine speed and torque responsive devices correlated to differentially control said mechanism.

30. In an automobile, the combination with an engine, a propeller shaft, and a selective gear transmission controlling the engine-to-shaft drive ratio, of two members having a common axis of rotation, a transmission control device actuated in response to predetermined angular displacement of said members with respect to each other, an engine-driven governor determining the angular position of one of said members relatively to the other in accordance with the speed of the engine, and a torque-responsive device determining the angular position of the second of said members relatively to the first in accordance with engine torque, said governor, torque-responsive device and control device correlated to effect up and down shifts of the transmission substantially as dictated by the predetermined characteristics of the engine.

31. In an automobile, the combination with an engine, a propeller shaft, and a selective gear transmission controlling the engine-to-shaft drive ratio, of two members having a common axis of rotation and adapted for relative axial movement in response to predetermined angular displacement with respect to each other, an engine-driven governor including a fly weight associated with one of said members and arranged to advance or retard such member angularly of the other in accordance with the travel of said weight as determined by the engine speed, means for advancing or retarding said other member angularly of the first in accordance with the engine torque, and a transmission control member responsive to said relative axial movement.

32. In an automobile, the combination with an engine, a propeller shaft, and a selective gear transmission controlling the engine-to-shaft drive ratio, two members having a common axis of rotation, one having a cam surface and the other cooperating therewith, one of said members being free to move axially under the action of the cam in response to predetermined angular displacement of said members with respect to each other, a gear shifting device responsive to said axial movement, an engine-driven governor determining the angular position of one of said members relatively to the other in accordance with the speed of the engine, and a torque-responsive device determining the angular position of the second of said members relatively to the first in accordance with engine torque.

33. In an automobile, the combination with the engine of an automatic transmission comprising a plurality of gears, a plurality of shifter means for variously connecting gears in driving relation, a cam member movable to control all of said shifter means, power means for moving said cam in one direction to effect an up-shift of said gears and in the opposite direction to effect a down-shift, a control for said power means, and inter-acting devices responsive respectively to engine speed and torque determining the operation of said control.

34. In an automobile, the combination with the engine of an automatic transmission comprising a plurality of permanently meshed gears, clutches for variously connecting said gears in driving relation, shifter means for said clutches, power means for operating said shifter means, an engine speed responsive device, a torque spring transmitting the drive from the engine to said gears and a control for said power means operating in response to predetermined action of said speed-responsive device and torque spring.

35. In an automobile, the combination with the engine and a multiple ratio transmission, of an automatic control for the latter comprising a cam element and an element coacting with the cam surface thereof, said elements movable each with respect to the other, an engine-driven governor having an expanding weight associated with one of said elements and moving the same relatively to the other under varying engine speed, a torque responsive device, including a spring applying the power of the engine to said transmission, associated with the other of said elements and moving the same relatively to the first in accordance with the yield of said spring.

36. In an automobile, the combination with the engine and a multiple ratio gear box, of power operated shifter mechanism, connecting means interposed between said mechanism and the source of power, said means in one position applying the power to effect an increase and in another position to effect a decrease in drive ratio, an engine-driven speed responsive device, a torque responsive device, both said devices associated with said means and correlated to move the same into one or the other of its said positions in response to torque-speed conditions beyond the neutral zone limits determined by the characteristics of the engine.

37. In an automobile, the combination with an engine, a multiple-ratio transmission, an engine-driven speed responsive device, a device responsive to engine torque, and control means for said transmission associated with and movable by each of said devices under the control of the other, said devices being correlated to cause actuation of said control means in response to speed-torque conditions beyond the neutral zone limits dictated by the characteristics of the engine.

38. In an automobile, the combination of an engine, a multiple-speed transmission including a plurality of gears arranged to provide drive ratios varying in substantially geometrical series, an engine speed responsive device and a torque responsive device differentially controlling said transmission, said devices being correlated to effect a change of drive ratio substantially at the limit curves of the neutral zone for the particular engine.

39. In an automobile, the combination with the engine of an automatic transmission comprising a plurality of gears, control means operable to variously connect said gears in driving relation, a clutch, a speed responsive device connected to the driven member thereof, a torque spring transmitting the rotation of said driven member to said gears and means responsive to predetermined relative action of said speed responsive device and said torque spring to actuate said control means.

40. In an automobile, the combination with the engine of an automatic transmission comprising a plurality of gears, control means operable to variously connect said gears in driving relation, a clutch, a speed responsive device connected to the driven member thereof and mounted for rotation coaxially therewith, a torque responsive device operated by said driven member and likewise coaxial therewith and means responsive to predetermined relative rotation of said speed and torque responsive devices to actuate said control means.

RUSSELL W. TODD.